United States Patent
Vogtmeier

(10) Patent No.: US 11,331,851 B2
(45) Date of Patent: May 17, 2022

(54) FILLED CAVITY THREE-DIMENSIONAL PRINTED OBJECTS AND METHODS FOR PRODUCTION

(71) Applicant: KONINKLIJKE PHILIPS N.V., Eindhoven (NL)

(72) Inventor: Gereon Vogtmeier, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 420 days.

(21) Appl. No.: 16/346,902

(22) PCT Filed: Nov. 7, 2017

(86) PCT No.: PCT/EP2017/078438
§ 371 (c)(1),
(2) Date: May 2, 2019

(87) PCT Pub. No.: WO2018/087074
PCT Pub. Date: May 17, 2018

(65) Prior Publication Data
US 2020/0055238 A1    Feb. 20, 2020

Related U.S. Application Data

(60) Provisional application No. 62/418,835, filed on Nov. 8, 2016.

(51) Int. Cl.
*B29C 64/176* (2017.01)
*B33Y 10/00* (2015.01)
(Continued)

(52) U.S. Cl.
CPC .......... *B29C 64/176* (2017.08); *B29C 64/188* (2017.08); *B33Y 10/00* (2014.12); *B33Y 80/00* (2014.12)

(58) Field of Classification Search
CPC ............ G01L 1/02; G01L 5/171; B33Y 80/00
See application file for complete search history.

(56) References Cited

U.S. PATENT DOCUMENTS 5,156,629 A    10/1992  Shane et al.
2003/0181990 A1*  9/2003  Phillips ................. A61F 2/7843
                                                                623/37
(Continued)

FOREIGN PATENT DOCUMENTS

CN    105599178 A    5/2016
JP    H10180882 A    7/1998
(Continued)

OTHER PUBLICATIONS

International Search Report and Written Opinion for International Application Serial No. PCT/EP2017/0784438, filed Nov. 7, 2017, 16 pages.

*Primary Examiner* — Alex A Rolland
(74) *Attorney, Agent, or Firm* — Micah-Shalom Kesselman

(57) ABSTRACT

The disclosure provides a system and method for producing a 3D printed object that includes printing a plurality of cavities (110) within or interior to the object (1) and providing a plurality of passages (120) between the cavities so that at least a portion of the printed cavities are in fluid communication with each other. A fluid such as a gas or liquid (2) is then provided to fill a portion of the printed cavities, thereby providing a structure that is capable of damping impacts thereto.

11 Claims, 3 Drawing Sheets

(51) Int. Cl.
    *B33Y 80/00*     (2015.01)
    *B29C 64/188*     (2017.01)

(56) References Cited

U.S. PATENT DOCUMENTS

| 2004/0145629 | A1* | 7/2004 | Silverbrook | B33Y 50/02 |
| | | | | 347/40 |
| 2015/0052898 | A1 | 2/2015 | Erno et al. | |
| 2015/0101899 | A1* | 4/2015 | Russo | A42B 3/121 |
| | | | | 188/266 |

FOREIGN PATENT DOCUMENTS

| WO | WO2009119908 A1 | 7/2011 | |
| WO | 2011135079 A2 | 11/2011 | |
| WO | WO-2011135079 A2 * | 11/2011 | F15B 15/10 |
| WO | WO2014113695 A1 | 7/2014 | |
| WO | 2016056158 A1 | 4/2016 | |

\* cited by examiner

FILLED CAVITY THREE-DIMENSIONAL PRINTED OBJECTS AND METHODS FOR PRODUCTION

RELATED APPLICATIONS

This application is the U.S. National Phase application under 35 U.S.C. § 371 of International Application No. PCT/EP2017/078438, filed on Nov. 7, 2017, which claims the benefit of Provisional Application Ser. No. 62/418,835, filed Nov. 8, 2016. These applications are hereby incorporated by reference herein, for all purposes.

TECHNICAL FIELD

The present disclosure is directed generally to three-dimensional printing techniques. More particularly, but not exclusively, the methods and apparatus disclosed herein relate to systems, and methods for three dimensional printing of functional cavities within an object, and to the objects produced thereby.

BACKGROUND

Three dimensional ("3D") printing technologies, or more specifically additive manufacturing, provides the ability to produce objects that are otherwise extremely difficult and time-consuming to produce through the use of conventional manufacturing techniques. 3D objects are created by layering and connecting successive cross-sections of material as directed in, for example, an STL (stereo lithography), AMF (additive manufacturing file), a 3MF format file, or any other 3D printing file format commonly used to define objects (or slices thereof) for production by a 3D printing system.

Various 3D printing methods and materials are used to produce a vast array of objects: stereo lithography, fused deposition modeling, selective laser melting, selective laser sintering, direct metal laser sintering, laminated object manufacturing, directed energy deposition, direct ink writing, and fused filament fabrication are but a few of the commonly used 3D printing techniques that offer advantages and disadvantages depending upon the desired object shape and material being used to create it.

Typically, in most manufacturing processes the material properties inside a manufactured structure are fixed. A machined metallic object, for example an aluminum part, will be necessarily formed of a uniform material throughout the entire object. If multiple material properties are desired, the object typically has be to manufactured in a plurality of steps using more than one manufacturing technique. 3D printing, however, offers the ability to vary the material properties of an object in different areas by varying the amount of material deposited or laminated in a given location, whereby the material property may be variable depending on its position within the object. Furthermore, 3D printing technologies provide the ability for object to be designed and manufactured having multiple material properties within the same object, varying from soft or compressible areas to stiff or rigid areas depending upon the process parameters. Some 3D printing technologies also have the ability to utilize multiple materials in the printed object thereby providing a multi-material finished product.

SUMMARY

The present disclosure is related to methods and systems for additive manufacturing or printing an object having defined cavities or voids therein and to the objects themselves. These cavities may be fully closed or partially closed. In some embodiments a plurality of printed cavities may be partially open and interconnected with other printed cavities through a series of apertures or connecting channels to enable the flow of a gas or liquid there between.

In various embodiments, the methods disclosed herein provide a printed object with a plurality of interconnected cavities that form a damping structure therein to resist deformation or reduce impact in other areas of the object, depending upon the orientation and connections between the cavities. Furthermore, the number of cavities and the cross-sectional area of the apertures or channels connecting them may be positioned to provide damping, actuation, and pressure sensing function within the manufactured object.

In other embodiments, the methods disclosed herein may be used to produce an object that functions as an actuator that is responsive to external placed upon the printed object. The amount of pressure required to activate the actuator may be modified by designing various system parameters such as the number and positioning of cavities, the type of fluid therein, the viscosity of the fluid therein, the pressure of the fluid therein, and the number and cross-sectional area of the passageways between the cavities.

In other embodiments the cavities and/or passages between the cavities may be formed of flexible material such that deformation of a subset of the cavities forces gas or fluid into other non-deformed connected cavities. In another embodiments, fluid may be supplied under pressure to a plurality of cavities to control the height, width, or general shape of an object or structure, or to reform an otherwise deformed object or structure. In a yet further embodiments the flow of fluid between individual cavities or to the system of cavities as a whole may be controlled or altered by a fluid restriction device, such as a valve, disposed in passages between adjacent cavities or in a fluid supply line to the entire system of connected cavities.

Generally, some embodiments include a system and method for producing a 3D printed object that includes printing a plurality of cavities within or interior to the object and providing a plurality of passages between the cavities so that at least a portion of the printed cavities are in fluid communication with each other. A fluid such as a gas or liquid is then provided to fill a portion of the printed cavities, thereby providing a structure that is capable of damping impacts thereto, or even "self-healing" where the fluid can be pressurized to flow from a first cavity portion to an adjacent cavity portion.

As used herein for purposes of the present disclosure, the terms "3D printing" or "additive manufacturing" should be understood to be generally synonymous and include any method, process, or system used to produce a three-dimensional object where successive layers of material are deposited under computer control utilizing digital model data to create the object. Thus, the terms 3D printing and additive manufacturing include, but are not limited to, various three-dimensional object production methods such as any type of extrusion deposition, fused deposition modeling, fused filament fabrication or other extrusion processes, stereo lithography, digital light processing of photopolymers, laminated object manufacturing, directed energy deposition, electron beam fabrication, powder bed printing, inkjet head 3D printing, direct metal laser sintering, selective laser sintering, selective heat sintering, electron-beam melting, or selective laser melting. Furthermore, these additive manufacturing methods may be used to produce objects from a wide array of materials, including, but not limited to almost any metal alloy, metal foils, metal powders, ceramic powders, plastic films, powdered polymers, photopolymers, various ceramic materials, metal matrix composite materials, ceramic matrix composite materials, metal clays, thermoplastics, eutectic materials, rubbers, and even edible materials. Furthermore, the term "3D" printing may encompass objects produced by any known object modeling technique including but not limited to CAD (computer aided design) modeling, 3D scanner, or even conventional digital cameras and concomitant photogrammetry.

The terms "cavities" or "voids" as used in this disclosure should be understood to refer to any one or more of a variety of empty spaces wholly or partially enclosed by a 3D printed structure. Cavities can further refer to empty spaces bounded by almost any 3D printed shape, including but not limited to spheres, honeycombs, or any other three-dimensional shape that provides suitable structural properties required for the object being printed.

For purposes of this disclosure, the term "object" should be understood to refer to any 3D printed part, component, structure or fabrication.

Also, for purposes of this disclosure the term "fluid" should be understood to encompass any known gas or liquid that can be used to fill or partially fill cavities and passages within a 3D object.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). Storage media may also be remotely situated, for example cloud data storage via a wired or wireless connection. In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein.

DETAILED DESCRIPTION

In the manufacture of three-dimensional objects needed as parts or components of assemblies it is difficult and expensive an object having a complex geometry. Often, components with various internal voids or cavities must be manufactured in a multiple part process, wherein a portion of the cavity is manufactured into each part and the parts are then mated to produce the required cavity. Additionally, many manufacturing techniques for complex geometry components require a monolithic material throughout, which limits the item to having the same material properties through the entire object or component. Accordingly, there is a need for manufacturing complex components having cavities therein in an efficient and cost-effective fashion. More generally, the Applicants have recognized and appreciated that it would be beneficial to produce a complex geometry component having position-dependent material properties.

Referring now to FIGS. 1-4, in some embodiments, the process 10 for producing an object 1 having position dependent material properties includes providing a 3D model of the object 1 defining a system 100 that includes plurality of cavities 110 disposed within the object 1. It should be appreciated that a wide variety of 3D printing systems may be employed to practice the various embodiments disclosed herein. 3D printing systems utilizing controllers, processors, and concomitant systems for material deposition may be used to practice the embodiments detailed in this specification without departing from the scope of the present disclosure.

Figure 1:
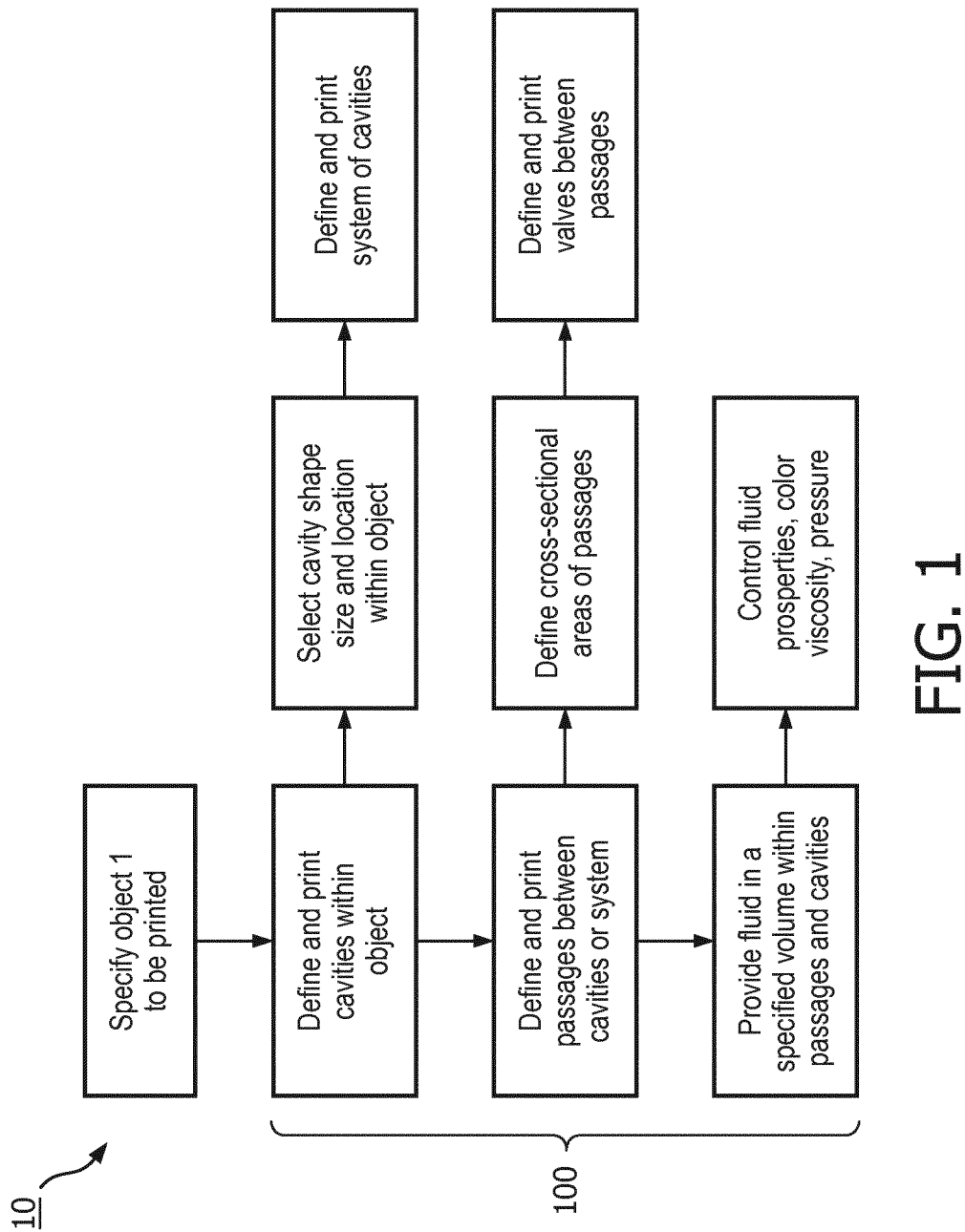
FIG. 1 is a block diagram of a process used to implement techniques described herein, in accordance with various embodiments.
Figure 2:
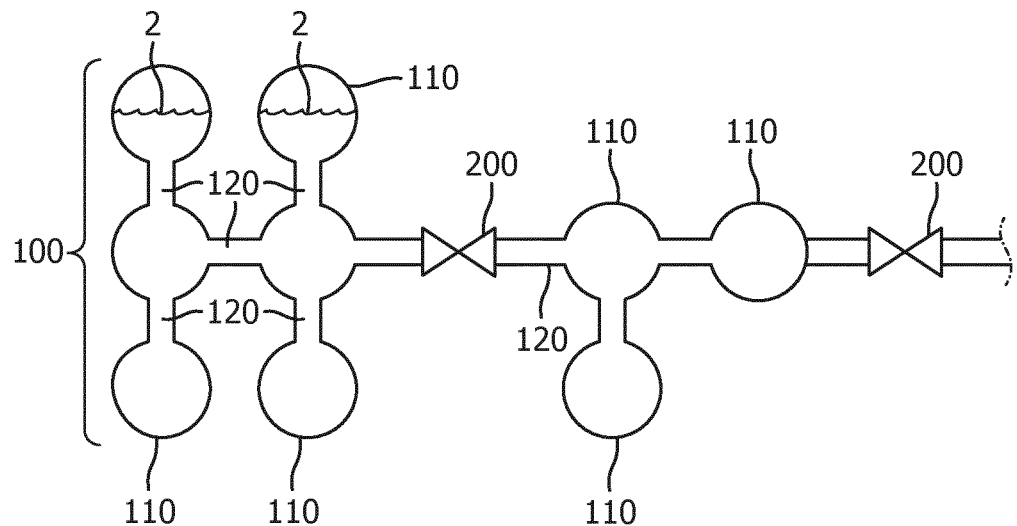
FIG. 2 depicts a system of cavities and passages in accordance with various embodiments.

Cavities 110 may be bounded by structures that provide a wide variety of cavity shapes, for example spheres, cubes, spheroids, pyramids, or any three dimensional shape capable of being manufactured in a 3D printing process. In one embodiment, and as shown in FIG. 2 for example, cavities 110 are generally spherical in shape, such that they form "bubbles" within object 110. While the cavities 110 depicted in FIG. 1 are spherical in shape this is not meant to be limiting, but rather an example of one such shape that may be employed in various embodiments. Furthermore, in some embodiments, the plurality of cavities 110 are connected to adjacent cavities 110 by passages, apertures, tubes, conduits, or pipes 120, such that connected cavities 110 are in fluid communication with each other through passages 120.

It should be further noted that the shapes of cavities 110 and the 3D printed structures 112 that surround them may not be congruous. For example, a rectangular 3D structure or cell may be produced that encloses, either wholly or partially, a spherical cavity 110 without departing from the scope of the present disclosure. This embodiment permits the design of cavities 110 whereby a bounding structure has a specified structural integrity or resistance to deformation, based upon the material used in the manufacturing process and the dimensions of the structure being printed. One of skill in the art will recognize that a great number and variety of structural shapes may be printed to enclose cavities 110 that may also have a great variety of shapes. For example, rectangular or square structures of varying sizes may incorporate a matrix of cavities having various shapes therein, or alternatively triangular or mesh-like cavity structures may be provided. Hexagonal pillar matrix cavity structures may also be employed in some embodiments.

In various embodiments, passages 120 linking cavities 110 may have various cross-sections; square, round, rectangular, triangular, or any polygonal shape. Furthermore, cavities 110 may be interconnected with adjacent cavities 110 by more than one passage 120, or be connected to a plurality of other adjacent cavities 110, such that there may exist a plurality of fluidly communication paths between adjacent cavities 110. By controlling the cross-sectional area of connecting passages 120 the flow of a fluid 2 such as a liquid or gas between adjacent cavities 110 can be controlled to produce desired material properties within specified areas of object 1, simply by providing a matrix of printed cavities in the desired area. Furthermore, some portion of cavities 110 may be connected by passages having larger cross-sectional areas, whereas other portions of cavities may be connected by passages having smaller cross-sectional areas. In this fashion the structure object 1 produced by various embodiments may react differently to pressure or impact in different areas depending upon how much fluid is restricted flowing from one area to another. In some embodiments a plurality of varying size passage 120 systems or even portions of cavities having differing viscosity liquids may be provided to produce an object with multiple different deformation zones. In yet further embodiments the fluid provided in cavities 110 may be temperature dependent so that the object 1 produced by the system according to various embodiments reacts differently at different temperatures.

In various embodiments, the fluid 2 may be a liquid substrate used by the 3D printing technology used. For example, where stereolithography (SLA) is used to produce the structure 100, the fluid 2 may be liquid resin that was not solidified during the manufacturing process. In such embodiments, the fluid 2 may be automatically disposed within the structure simply by virtue of forming the solid structure within a liquid bath. In other embodiments, liquid may be added to the internal cavities of the structure at some point during creation of the structure before the structure is completed.

It should be noted that in some embodiments connected cavities 110 and passages 120 may be manufactured to be fluid tight by precise manufacturing and/or processing of the object 1. However, it is not necessary that fluid tight structures be produced. For example, in one embodiment connected cavities 110 and passages 120 may simply be filled with a gas such as air, which can then be forced out of the system 100 when it is deformed or under pressure, as will be discussed in greater detail herein below.

In some embodiments, where a plurality of cavities 110 are in fluid communication with each other via a plurality of passages 120, a fluid 2 (liquid or gas) may partially fill the volume of cavities 110 and passages 120 to provide a damping mechanism in a specified area of the object 1 containing the cavities. In one aspect, the cross-sectional area of the passages 120 between the cavities may be sized to regulate the flow of fluid 2 between adjacent cavities 110, thereby providing a damping functionality to object 1 if it is subjected to external pressure or deformation in those areas. In a yet further embodiment by linking a plurality of cavity 110 structures with passages 120, this damping function can be customized to provide a housing for sensitive components (not shown) that protects the enclosed components by slowly deforming under pressure as the partially fluid 2-filled cavities are compressed and fluid 2 flows from a plurality of cavities 110 and passages 120 under high pressure to those under lower pressure. Thus the deformation of the system 100 of interconnected cavities 110 and passages 120 is damped or mitigated by fluid 2 flow through the system 100, thereby absorbing energy as the fluid 2 is forced from high pressure to low pressure areas of object 1.

Figure 3:
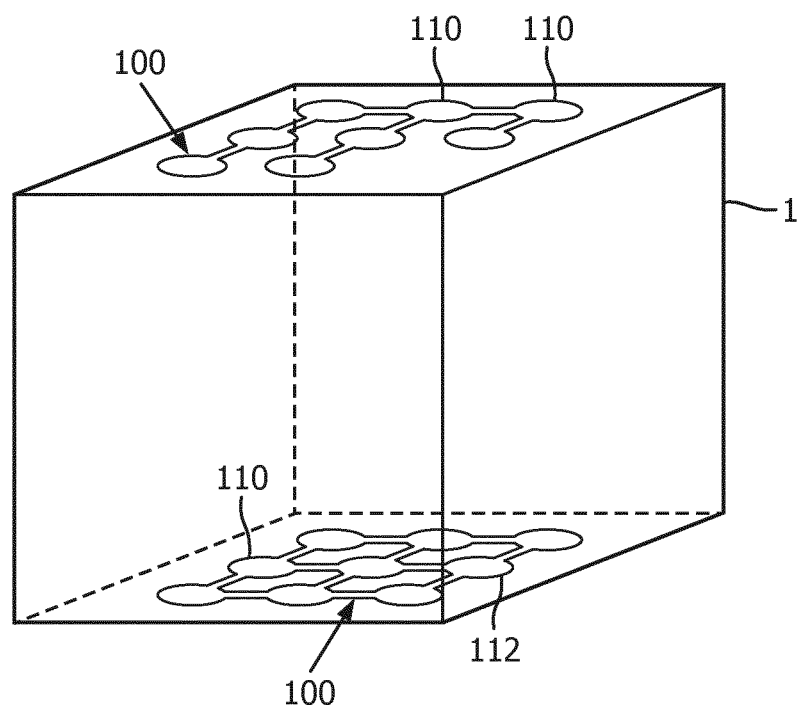
FIG. 3 is a 3D printed object in accordance with various embodiments.

Accordingly, as seen in FIGS. 2 and 3 in some embodiments a predefined area or a plurality of predefined areas within an object 1 may be designate to incorporate a system 100 of interconnected cavities 110 and passages 120 containing a predetermined volume of fluid 2. In a further aspect the fluid 2 contained therein may be placed under a predetermined pressure to provide a desired damping function. This interconnected system 100 may thus be designed to provide a specified damping or impact protection function in a given area of an object, or alternatively function as an actuator when the system 100 is subjected to an external pressure. Furthermore, a plurality of systems 100 may manufactured into an object 1 to produce an object having variable material properties.

Figure 4:
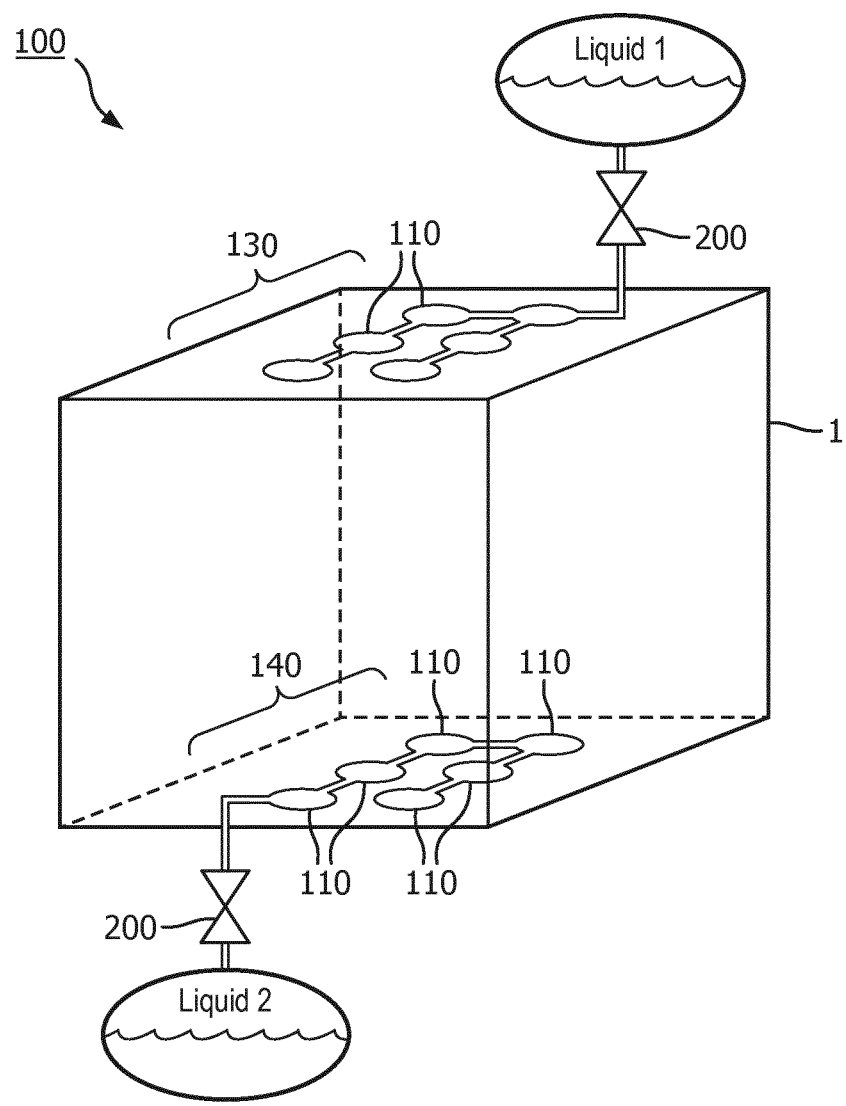
FIG. 4 is a 3D printed object in accordance with various embodiments.

Additionally, in some embodiments as seen in FIG. 4, a first array 130 of cavities 110 may be provided with a first liquid or fluid 2, while a second array 140 of cavities may be provided with a second liquid 2. The first and second liquids provided to these two arrays 130, 140 of cavities 110 may be the same, or have different viscosities as necessary to provide a required amount of damping for object 1. In some embodiments the various arrays 130, 140 may be disposed within object 1 in specific orientations to provide structural damping in a specified direction. For example, an array 130 may be arranged to provide damping along a specified axis or direction within object 1 to resist deformation or impact in that specified direction. As can be readily seen, this feature may provide the ability to produce an object that has customizable damping in a plurality of directions, based upon the size and shape of the cavity 110 array, the liquid 2 provided therein, the pressure of said liquid, and the orientation of the array within object 1.

Accordingly, in various embodiments the 3D printing process used to manufacture object 1 may utilize material surrounding cavities 110 and passages 120 that is relatively flexible and deformable. This feature may be desirable for applications wherein object 1 is utilized as an actuator or a damper. Additionally, stiffer materials may be utilized between or around softer materials to act as a limitation to deformation or damping between softer materials. Materials such as thermoplastics and polyamides may be employed to print structures in accordance with this embodiments, but these materials are not to be seen as limiting embodiments, but rather exemplary embodiments.

Referring again to FIG. 2, in some embodiments, a valve 200, or a plurality thereof, may be incorporated into a system 100 of cavities 110 and passages 120 to control the inflow and/or outflow of fluid 2 through the system 100, thereby controlling the pressure therein and the damping function of the system 100 as a whole. In accordance with some embodiments valves 200 may be printed as part of object 1 to restrict fluid 2 flow between parts of system 100, or between adjacent cavities 110. Furthermore, valves 200 may be disposed in passages 120 such that they may restrict or permit fluid 2 flow between cavities. In one embodiment, a single valve 200 is provided in fluid 2 communication with a system 100 to provide the ability to control fluid 2 entering or exiting system 100, thereby controlling its damping or actuating properties. In this embodiment valve 200 may be in fluid communication with both a source of pressurized fluid 2 and at least one cavity 110 to control the flow and/or pressure of fluid 2 entering system 100. In some embodiments valves 200 may be 3D printed as an integral part of object 1. In other embodiments, valves 200 that are provided separate from object 1, may be installed in fluid 2 communication with the cavities 110 of an object 1, either between passages 120 or in a fluid 2 supply or drain line that is in fluid 2 communication with cavities 110 without departing from the scope of the present disclosure.

In some embodiments a plurality of valves 200 can be placed between sections or groupings of cavities to control the flow of fluid 2 there between. Such embodiments may provide the ability to have different "zones" of damping within a single object 1 by simply controlling and properly sizing valves 200. Alternatively, in some embodiments different damping zones can also be provided within a single object 1 by providing passages 120 that having smaller or larger cross-sectional areas between systems 100 or zones of cavities 110, thereby limiting or increasing fluid 2 flow from one area to another when a system 100 or set of cavities 110 is subjected to pressure.

In some embodiments the height, width, or other dimension of an object 1 being printed may be designed to be variable by utilizing a flexible material to print the structures surrounding cavities 110 and incorporating a plurality of empty cavities 110 into areas of the object that are to be expanded. Utilizing this embodiment, an object 1 produced in accordance with the principles disclosed herein can operate as an actuator. In one exemplary embodiment cavities 110 can be shaped generally as rectangular cavities, having convex sides that can later be expanded. For example, a housing or similar object 100 may incorporate a plurality of rectangular cavities 110 and interconnecting passages 120 into an upper edge thereof. Once the housing or object 1 is in place, the upper edge can be expanded by supplying a system 100 of cavities 110 with a source of pressurized fluid 2, thereby expanding rectangular cavities 110 and thus expanding the dimensions of object 1. Similarly and conversely, an object 1 may be reduced in some dimensional aspect by withdrawing fluid 2 from a plurality of cavities 110, thereby collapsing a portion of the object 1. It should be recognized that a wide variety of variable object 1 shapes may be achieved by incorporating systems 100 or zones of cavities 110 in an object 1 that are oriented to expand, retract, or collapse in a desired direction or directions.

In yet further embodiments, an object 1 may be produced utilizing a multi-material 3D printer wherein individual structures surrounding cavities 110 may be printed of a first material and the cavities 110 themselves may be filled or partially filled with a second material, which may be a liquid or a more flexible material. Furthermore, arrays 130, 140 may be printed from materials having different hardness. The combination of different materials, arrays, and fluids 2 provides the ability to customize multiple zones of deformation within a single printed object 1. This embodiment may provide a further cost-effective method to produce a multi-property object.

In some embodiments, cavities 110 may be filled with a variety of liquids that perform an indicating function within the object 1. In one non-limiting example, a colored liquid may be used to fill a plurality of cavities 110 within a first system while an adjacent second system 100 of cavities 110 is left unfilled. When the first system 100 of cavities 110 is subjected to pressure or a similar force, a portion of the liquid may be forced into the second system 100 of cavities, thereby providing a visual indication that an object 1 has been subjected to force in a given area, namely the first system 100. In this fashion, various embodiments may be capable of providing a readily seen visual indication of the stresses placed on objects designed with the processes and concepts disclosed herein. These colored liquid-filled cavities can also be used to indicate excessive stress placed on an object 1 in an item of manufacture, such that it can be quickly determined if the object 1 needs to be replaced or repaired. In one embodiment, where the amount of pressure required to force the liquid from a first cavity 110 to a second cavity 110 exceeds a predetermined threshold, the presence of the liquid in the second cavity 110 provides a visual indicator of excessive stress in the object 1. In a yet further embodiment, a sensor can be employed to detect the pressure and/or presence of the liquid in said second cavity without departing from the scope of the present disclosure.

Furthermore, in some embodiments other types of liquids having differing visual properties may be utilized with the embodiment taught herein. For example, photochromic liquids, temperature sensitive inks, or other liquids that changes color responsive to temperature may be placed in a plurality of cavities 110 to provide an instant visual indicator of a temperature range or ranges within an object. Utilizing these embodiments an object 1 can be constructed with a plurality of systems 100 of cavities 110 having temperature sensitive fluids disposed therein so that a visual indicator of the temperature a given portion or area of the object is readily accessible. Furthermore, any fluid property that varies responsive to pressure may be measured and/or monitored in a cavity or cavities 110 to provide an indicator of the pressure and/or deformation of object 1 in a predetermined area without departing from the scope of the present disclosure.

In a yet further embodiment a plurality of cavities 110 may be filled with a glue or other adhesive so that the adhesive is released upon the occurrence of a deformation or pressure to the adhesive-filled cavities. In these embodiments an object can be designed wherein a gluing process step can occur after the object is in place in a component or assembly and the object is then impacted or stressed in a predetermined area. Glue filled cavities, in one embodiment, can be destroyed or permanently opened by deformation pressure, thereby releasing glue into the surrounding volume of the object 1.

In a yet further embodiment cavities 110, or systems 100 thereof may be designed to contain or actuate pressure foils or similar pressure detection apparatus that may then communicate with a controller to indicate a specific pressure or area of pressure in an object 1. In embodiments where fluid 2 is supplied under pressure to repair the geometry of a plurality of cavities 110 this pressure foil embodiment can be used repeatedly in monitoring pressure in an object as the cavities 110 are compressed and the expanded. Furthermore, utilizing pressure foils proximate or within cavities 110 permits the direction and/or area of pressure to be measured, within an object 1 which may be particularly useful where the pressure or deformation is not visible or readily detectable within an assembly.

Additionally or alternatively, the structures and methods taught in this disclosure can be utilized in conjunction with a variety of MEMS devices that can be 3D printed within objects 1 or provided on or within an individual cavity 110 or system 100 of cavities 110. Such embodiments may provide the ability to design and print a sensor for measuring a wide variety of physical variables in a single manufacturing process. For example, MEMS sensors such as pressure sensors, gyroscopes, accelerometers, piezoelectric devices, and even displays can be integrally printed within or around cavities 110 disposed in an object to provide positive feedback of any event or physical measurement impacting the object 1. For example a MEMS sensor may be inserted within an empty cavity 110 and connected passage 120 printed with object 1. The MEMS sensor may then provide a signal when the cavity is subjected to pressure or deformation which can be measured by externally provided equipment.

In various embodiments, structures according to those described herein may be defined as part of an object described in a digital file (e.g., an STL, AMF, 3MF file) for use by a printer for manufacturing the object. For example, the digital file itself may define the exact bounds of the cavities, channels, etc. to be produced. In other embodiments, the digital file may instead assign an indicator of a specific material type (e.g., "dampening material") to one or more portions of the object defined therein. The printer or other component (e.g. a computer transmitting slices to the printer for production) instructing the printer may then interpret this material assignment to indicate that the associated portion of the object is to be produced as a matrix or other grouping of channel-connected cavities, as described herein. The material type may be associated with specific parameters to be used in defining the cavities (e.g., cavity shape/diameter/dimension, channel shape/diameter/length/dimensions, inter-cavity spacing, number of layers of cavities, arrangement of cavities, etc.). As such, a different material type may be defined for each desired combination of parameters. In other embodiments, the material may be "tunable." In some such embodiments, the digital file may include parameter values to be applied to the material when the assigned object portions in the digital file are "replaced" with the cavities, channels, etc. prior to production (e.g., prior to slicing and transmission to the printer). In other such embodiments, the computer device controlling the 3D printer may obtain the parameters from elsewhere (e.g., from another file or by prompting the user to input values). The material type may be built into and understood by CAD software or other software for driving the operation of the 3D printer. Upon preparing slices for production of the object (or otherwise converting the data in the digital file into a form ready for use by the printer to produce the object), the printer, computer, or other component replaces any structures or volumes associated with the material type with an arrangement of cavities and channels (according to any associated parameters as described above) generally occupying the space of the replaced structure or volume. Thereafter, the modified model may be sliced or otherwise prepared for production via the 3D printer.

While a variety of embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the systems, methods, and principles described herein. Those skilled in the art will understand that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope of the invention.

What is claimed is:

1. A method for producing a stress-indicating object by three-dimensional printing of a material comprising:
   printing a plurality of cavities within said object;
   printing at least one passage for fluid communication between a plurality of said cavities; and
   providing a fluid disposed within at least one of said cavities, wherein said fluid is a liquid, said at least one passage being provided with a specified cross-sectional area at a specified length for controlling the flow of said fluid there through,
   said at least one passage being arranged to provide an indication that the stress indicating object has been subjected to force in the area of the at least one of said cavities when a portion of the liquid is forced through said at least one passage, characterized in that a colored liquid is used to fill a plurality of first cavities while an adjacent second cavities are left unfilled, whereby the stress-indicating object is arranged for providing a visual indication of the stress-indicating object being subjected to a force in the first cavities resulting in forcing a portion of the colored liquid into the second cavities.

2. The method of claim 1, further comprising providing a plurality of passages for fluid communication between said plurality of cavities.

3. The method of claim 2 comprising providing the plurality of passages with a predetermined cross-sectional area for controlling the flow and pressure of said fluid there through.

4. The method of claim 2 further comprising printing a valve in fluid communication with a one of said plurality of passages to restrict fluid flow between fluidly communicating cavities.

5. The method of claim 2 further comprising printing a plurality of valves in fluid communication with said plurality of passages to restrict fluid flow between fluidly communicating cavities.

6. The method of claim 1 comprising printing a plurality of expandable cavities within said object, wherein said cavities are expandable in a predetermined direction.

7. The method of claim 6 comprising supplying said fluid under pressure to said expandable cavities to expand said cavities in the predetermined direction.

8. The method of claim 1, wherein a plurality of cavities is formed of a fluid-tight flexible material to define a deformable system.

9. The method of claim 1 wherein the step of providing said fluid comprises providing said fluid at a predetermined pressure.

10. The method of claim 1 comprising printing said object with a plurality of materials.

11. The method of claim 1 wherein said cavities and passages are printed with a first flexible material and said object is printed with a second material.

* * * * *